United States Patent
Eguchi

(10) Patent No.: US 7,206,085 B1
(45) Date of Patent: Apr. 17, 2007

(54) NETWORK FACSIMILE DEVICE AND COMMUNICATION METHOD THEREFOR

(75) Inventor: Masashi Eguchi, Uji (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 0 days.

(21) Appl. No.: 09/548,024

(22) Filed: Apr. 12, 2000

(30) Foreign Application Priority Data

Apr. 12, 1999 (JP) ................................ 11-104625

(51) Int. Cl.
*G06F 15/00* (2006.01)
(52) U.S. Cl. ...................................... 358/1.15; 358/407
(58) Field of Classification Search ............... 358/1.15, 358/1.16, 401, 402, 404, 405, 407, 442, 444, 358/460, 1.1, 1.12, 1.13, 1.14, 400
See application file for complete search history.

(56) References Cited

U.S. PATENT DOCUMENTS

| | | | | |
|---|---|---|---|---|
| 5,521,719 A | * | 5/1996 | Yamada | 358/438 |
| 5,719,688 A | * | 2/1998 | Kagami | 358/468 |
| 5,907,599 A | * | 5/1999 | Sakayama et al. | 379/100.17 |
| 6,020,981 A | * | 2/2000 | Ogiyama | 358/434 |
| 6,097,797 A | * | 8/2000 | Oseto | 379/100.08 |
| 6,137,597 A | * | 10/2000 | Kanaya | 358/402 |
| 6,157,945 A | * | 12/2000 | Balma et al. | 709/206 |
| 6,230,189 B1 | * | 5/2001 | Sato et al. | 709/206 |
| 6,313,926 B1 | * | 11/2001 | Kumagai et al. | 358/442 |
| 6,335,966 B1 | * | 1/2002 | Toyoda | 358/442 |
| 6,348,927 B1 | * | 2/2002 | Lipkin | 345/619 |
| 6,417,930 B2 | * | 7/2002 | Mori | 358/1.15 |
| 6,437,873 B1 | * | 8/2002 | Maeda | 358/1.15 |
| 6,438,217 B1 | * | 8/2002 | Huna | 379/88.14 |
| 6,457,044 B1 | * | 9/2002 | IwaZaki | 709/206 |
| 6,466,330 B1 | * | 10/2002 | Mori | 358/1.15 |

(Continued)

FOREIGN PATENT DOCUMENTS

| | | |
|---|---|---|
| JP | 08-116321 | 5/1996 |
| JP | 08-172439 | 7/1996 |
| JP | 08-242311 | 9/1996 |
| JP | 08-256235 | 10/1996 |
| JP | 09-261372 | 10/1997 |
| JP | 10-191012 | 7/1998 |
| JP | 10-285326 | 10/1998 |
| JP | 11-098273 | 4/1999 |

*Primary Examiner*—Mark Wallerson
(74) *Attorney, Agent, or Firm*—Hogan & Hartson LLP

(57) ABSTRACT

A network facsimile machine (1) is connected to PSTN (3) such that it can receive fax data from a remote facsimile machine (2) over the PSTN (3). The network facsimile machine (1) is also connected to LAN (6) such that it can deliver the received fax data to a designated recipient (4 or 5) on the LAN (6). When a communication control unit (11) of the network facsimile machine (1) receives a ring signal over the PSTN (3) from the remote facsimile machine (2), it performs a communication procedure with the remote facsimile machine (1) and receives data identifying a network final recipient (4 or 5) to which the fax data will be delivered. The network facsimile machine (1) then references a delivery recipient table (12) based on the data identifying the final recipient, and reads out the reception capabilities of the identified recipient. The network facsimile machine (1) then declares the reception capabilities of the identified recipient to the remote facsimile machine (2), and the subsequent facsimile transmission proceeds at transmission parameters within the capabilities of the recipient. When the fax data is received from the remote machine (2), it is delivered as-is, without conversion, to the identified recipient since the fax data is sent from the remote facsimile machine (2) in accordance with the recipient's capabilities.

21 Claims, 4 Drawing Sheets

U.S. PATENT DOCUMENTS

| | | | |
|---|---|---|---|
| 6,469,796 B1 * | 10/2002 | Leiman et al. | 358/1.15 |
| 6,498,837 B1 * | 12/2002 | Baba | 379/100.08 |
| 6,512,593 B1 * | 1/2003 | Yashiki | 358/1.15 |
| 6,552,826 B2 * | 4/2003 | Adler et al. | 358/442 |
| 6,587,219 B1 * | 7/2003 | Saito et al. | 358/1.15 |
| 6,608,696 B1 * | 8/2003 | Iimoto et al. | 358/1.15 |
| 6,614,548 B1 * | 9/2003 | Kisono | 358/1.15 |
| 6,618,749 B1 * | 9/2003 | Saito et al. | 709/207 |
| 6,825,955 B1 * | 11/2004 | Shibata | 358/402 |
| 2003/0002085 A1 * | 1/2003 | Sugawara et al. | 358/407 |

* cited by examiner

NETWORK FACSIMILE DEVICE AND COMMUNICATION METHOD THEREFOR

BACKGROUND OF THE INVENTION

1. Field of the Invention

The present invention relates to a network facsimile apparatus capable of conducting facsimile communication with a remote facsimile device via a PSTN (public switched telephone network) line and capable of connecting to a LAN (local area network) or similar network.

2. Description of the Related Art

Recently, network facsimile machines that are connected to PSTN telephone lines and to a LAN-type network have been developed. Using such a network facsimile machine allows picture data to be transmitted from network-connected computer devices to remote facsimile machines via the network facsimile machine. Alternatively, facsimile data received over the PSTN from remote facsimile machines can be delivered to the LAN-connected computer devices and their users ("clients") via the network facsimile machine.

When facsimile data is sent from remote facsimile machines to a specified network-connected client, reception capabilities such as resolution and the like may differ from client to client. Just after communication is initiated between remote transmitter and network-connected receiver, normally the transmitter and receiver execute a pre-message procedure wherein the receiver declares its reception capabilities to the transmitter. When the fax transmission is to be delivered to a client device on the network, facsimile communication can be performed according to the reception capabilities of the recipient client to which delivery is to be made ("the delivery recipient") by transmitting the reception capabilities of the delivery recipient to the remote facsimile machine.

Unfortunately, there are times when the client to whom final delivery is to be made cannot be specified when the receiver-side capabilities are declared. Consider a typical example of fax communication procedure as illustrated in FIG. 4 of the accompanying drawings, in which a network facsimile machine receives fax data from a remote facsimile machine. The transmitting machine is the remote facsimile machine, and the receiving side is the network facsimile. The network fax receives a CNG signal sent by the remote fax. After first transmitting a CED signal to the transmitting machine, the receiving machine transmits a DIS signal declaring its communication capabilities.

Next, a TSI signal indicating the Transmitter's Station Identification, and a SUB indicating a sub-address, for example, are transmitted by the transmitting machine to the receiving machine. When facsimile data is to be delivered to a specified client on the network, the SUB or TSI signal may be used to specify the client. The network facsimile, however, does not receive the SUB and TSI signals until after the receiving side sends its DIS signal indicating its capabilities, meaning that the identity of the final recipient is uncertain. In other words, the network facsimile doesn't know the reception capabilities of the machine that will take final delivery of the fax data when it transmits the DIS signal indicating the its reception capabilities.

Thus, the conventional network facsimile machine declares either its own communication capabilities, or the highest capabilities possessed by any of the client machines, and receives the fax data from the transmitting machine according to those capabilities. After reception, the network fax must then perform a conversion program to convert settings like resolution to suit the capabilities of the final recipient. If transmission to the network fax machine has been performed at the highest communication capabilities of any of the client machines and it turns out that those capabilities exceed the capabilities of the final recipient, it means that the time it takes to transmit the data is longer than it would have taken to transmit the data at the optimal settings.

SUMMARY OF THE INVENTION

It is thus an object of the present invention to provide a network facsimile machine capable of receiving facsimile data over the PSTN at settings suited to the communication capabilities of the network client that is the final recipient of that facsimile data.

In order to accomplish this object, the present invention provides a network facsimile machine capable of connecting to both the PSTN and a second network, and including a capability storage unit that stores data for delivery recipients on the second network and corresponding reception capability data for said delivery recipients, and communication control unit that references the capability storage unit based on delivery recipient specifying data received over the PSTN and declares reception capabilities. The second network may be LAN, and a plurality of communication terminal devices (personal computers) and output devices (e.g., printers) may be connected to the LAN. The fax data received from a remote fax machine over the PSTN is delivered to designated terminal devices and/or printers on the LAN via the network facsimile machine. Since the reception capabilities are declared after reception of the delivery recipient-specifying data, the reception capabilities of the communication terminal device and/or printers that are the delivery recipients of faxed data on the second network can be declared, and facsimile communication can proceed according to the reception capabilities of the specified recipients. This then eliminates the need to convert the received fax data before it is delivered to the delivery recipients from the network facsimile machine. Additionally, particularly when the reception capabilities of a delivery recipient are inferior to that of the network facsimile, the amount of time required to transmit the fax data between the sender (remote fax machine) and receiver (designated recipient) can be reduced.

When using the SUB or TSI signal to specify the delivery recipient, the delivery recipient is determined after the reception capabilities have been declared. Therefore, the DIS signal is retransmitted after the delivery recipients are determined. In this manner, the reception capabilities are declared again according to the capabilities of the delivery recipients before facsimile transmission takes place.

Additional objects, benefits and advantages of the present invention will become apparent to those skilled in the art to which the present invention pertains from the subsequent description of the embodiments, modifications and appended claims, taken in conjunction with the accompanying drawings.

BRIEF DESCRIPTION OF THE ACCOMPANYING DRAWINGS

FIG. 1 schematically illustrates a network facsimile system employing a network facsimile machine of the present invention.

DETAILED DESCRIPTION OF THE INVENTION

Figure 1:
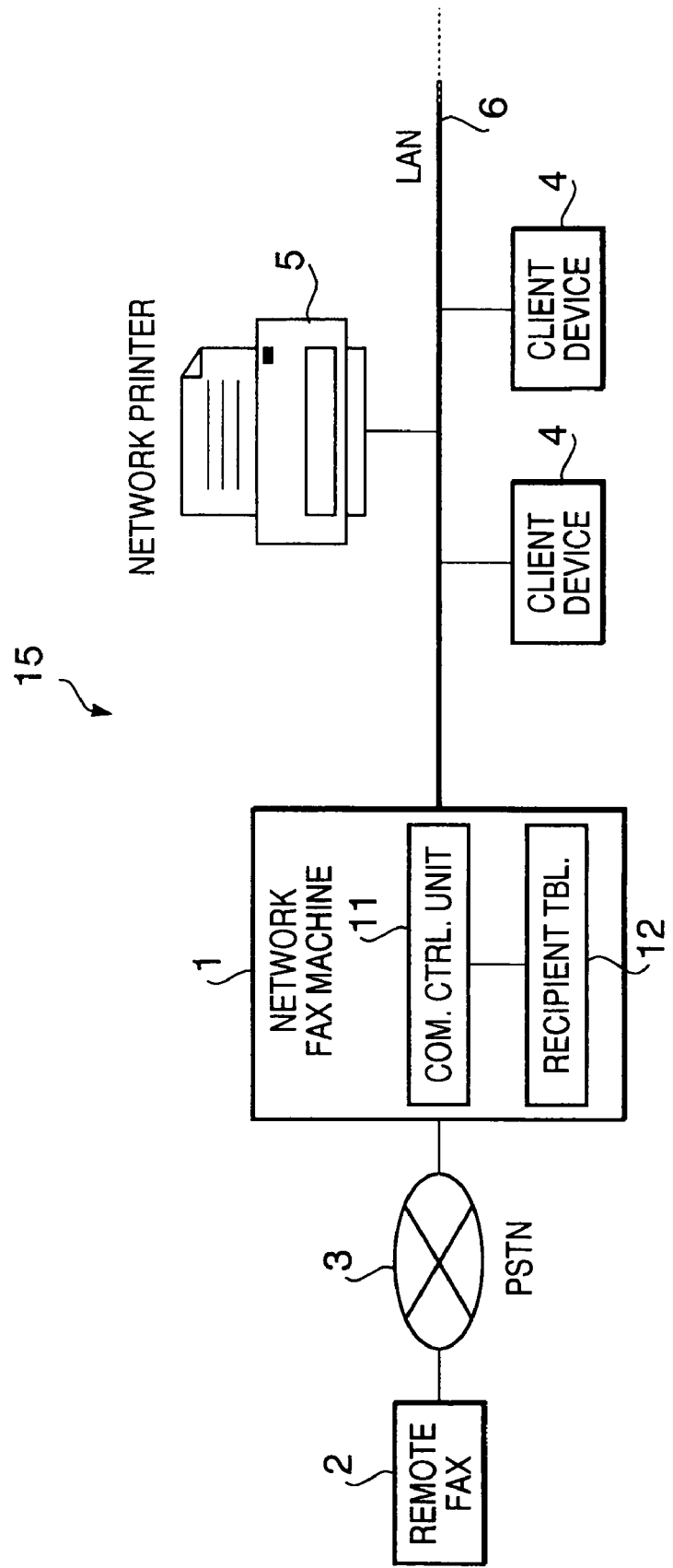

Referring to FIG. 1, illustrated is an outline view of an embodiment of a network fax system including a network facsimile machine of the present invention. The system 15 includes a network fax machine 1 connected to both LAN 6 and PSTN 3, a remote fax machine 2 connected to the PSTN 3, client machines 4 connected to the LAN 6, and network printer 5 connected to the LAN 6. The network facsimile machine 1 includes a communication control unit (CCU) 11, and final recipient table 12. The network fax 1 performs facsimile communication over the PSTN 3 with the remote fax 2. Since the fax 1 is also connected to the LAN 6, which connects various devices such as the clients 4 (e.g., personal computers, or the like) and the network printer 5, it can send and receive data to and from them. Naturally, the devices connected to the LAN 6 may be arbitrarily selected, and the present invention should not be interpreted as restricted to the arrangement of the system shown in FIG. 1.

The CCU 11 is provided with a function for performing facsimile communication with the remote facsimile machine 2 over the PSTN 3, and a function for performing communication with the various LAN-connected devices, such as the clients 4 and the network printer S. The CCU 11 enables communication between the PSTN-connected remote fax 2 and the LAN-connected clients 4 by using the function for communicating over the PSTN 3 and the function for communicating over the LAN 6.

When the CCU 1 receives a call from the remote fax machine 2, it receives data about the final delivery recipient on the LAN 6. This data is sent by the remote fax 2 during the transmission procedure performed immediately after establishing connection. The SUB signal or TSI signal may be used for this delivery recipient data. When the CCU 11 receives the delivery recipient data, it obtains necessary data such as LAN address of the final recipient as well as the communication capabilities of that recipient using the delivery destination table 12. It then repeats the pre-message procedure, this time declaring the recipient's communication capabilities it has just obtained to the remote facsimile machine 2. Alternatively, if the delivery destination data is an ISDN sub-address, DTMF signal or calling subscriber identification signal, the network fax 1 can specify the delivery recipient before declaration of the recipient's communication capabilities, and therefore continues the facsimile transmission procedure, declaring the communication capabilities of the delivery recipient to the remote fax. In either case, after declaration of the receiver-side communication capabilities, the network fax 1 and remote fax 2 performs facsimile communication according to the declared capabilities. The facsimile data that is received by the network fax 1 is then delivered to the delivery recipient on the LAN 6 according to the address data stored in the delivery recipient table 12.

The delivery recipient table 12 links client-specifying data, such as the network address of clients on the LAN 6, with corresponding address data, received during facsimile transmission from the remote fax 2 over the PSTN 3. The table 12 preferably matches client-specifying data with address data for every client on the LAN 6. Additionally, the table 12 functions as a capability information storage means, matching address data with capability data about the delivery recipients, possibly including reception capability such resolution, coding scheme and the like.

Figure 2:
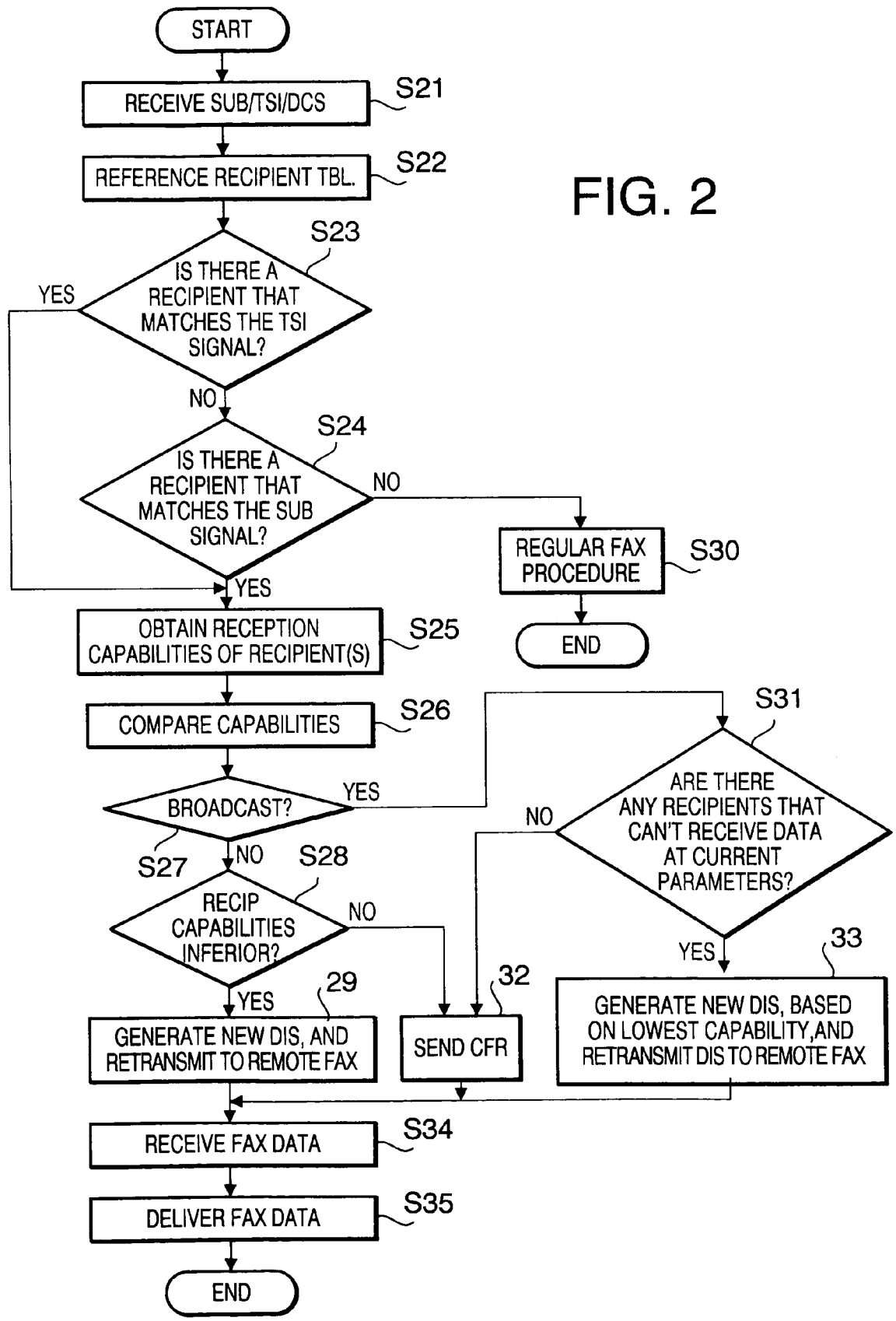
FIG. 2 is a flow chart illustrating an example of a facsimile reception procedure performed by the network facsimile machine shown in FIG. 1.
Figure 3:
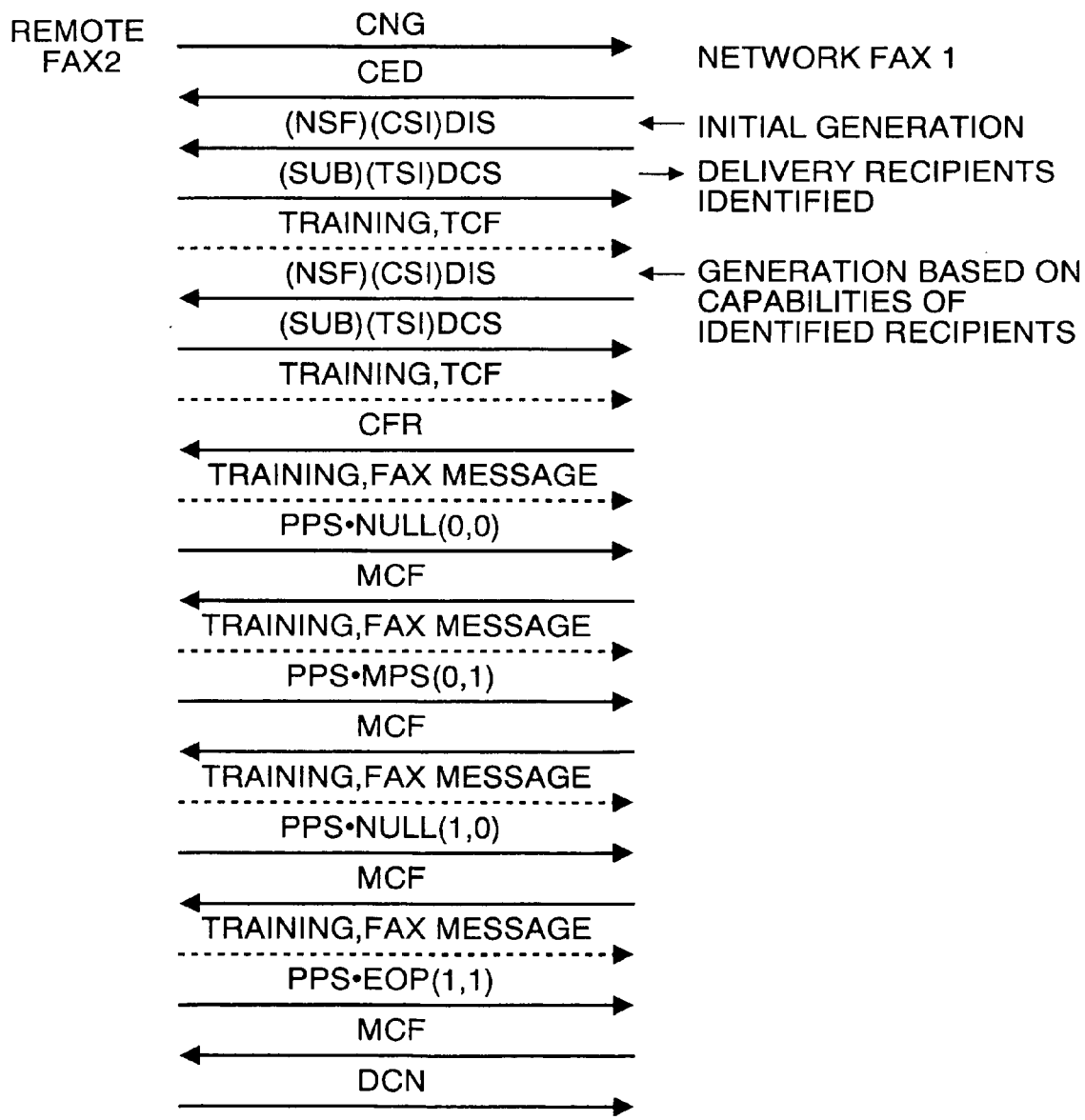
FIG. 3 is a sequence diagram showing an example of facsimile reception procedures employed by the network facsimile machine shown in FIG. 1.

FIG. 2 is a flow chart showing an example of a reception procedure executed between the remote facsimile machine 2 and the network facsimile machine 1. FIG. 3 shows the sequence and direction of signals and commands exchanged between the two fax machines 1 and 2 during the procedure illustrated in FIG. 2. This procedure is used to transmit fax data from the remote fax 2 via the network fax 1 to a specified delivery recipient (a client) on LAN 6. During this procedure, the network fax 1 first stores fax data received from the remote fax 2, and then delivers this data to the specified recipient.

In this example, the delivery recipient is specified using recipient-specifying data. SUB signal, or Transmitter Station Identifier (TSI) codes may be used as the recipient-specifying data.

The following description will focus mainly on the steps executed during communication between the remote fax 2 and the network fax 1.

Referring now to FIG. 3, when the remote fax 2 dials the network fax 1 over the PSTN 3, it sends a calling tone CNG. After the network fax 1 connects to the PSTN 3, it receives the CNG tone from the remote fax 2, and transmits a called station identification CED signal back to the remote fax 2. Subsequently, the network fax 1 transmits a digital identification signal DIS indicating its reception capabilities to the remote fax 2. It should be noted that this DIS signal may be preceded by a non-standard facilities NSF signal and a called subscriber identification CSI signal. At this point, the network fax 1 has not obtained any information indicating the LAN-based delivery recipient of the forthcoming transmission, so the network fax 1 will temporarily declare certain capabilities, such as its minimum or maximum reception capabilities, with the DIS signal.

The remote fax 2, which receives the DIS signal from the network fax 1, determines the transmission parameters such as resolution and speed based on the DIS signal, and then transmits a digital command signal (DCS) along with these parameters to the network fax machine 1. Training is then performed based on these parameters.

When the remote fax 2 sends the DCS signal to the network fax 1, the DCS signal may be preceded by either a SUB signal indicating a sub-address (SUB), or a Transmitting Subscriber Identifier (TSI) signal indicating information about the transmitter. The remote fax 2 is able to indicate to the network fax 1 the recipient to which delivery is to be made on the LAN 6 through the SUB or TSI signal.

Referring now to the flow chart in FIG. 2, at step S21, when the network fax 1 receives SUB, TSI, and DCS signals from the remote fax 2, it extracts data indicating the delivery recipient from within either the SUB or TSI signal. Next, at step S22, it references the delivery recipient table 12 based on this extracted data.

At step 23, the network fax 1 determines whether or not recipient data carried in the TSI is stored in the delivery recipient table 12. If not, then at step S24 it determines whether or not recipient data carried in the SUB signal is stored in the delivery recipient table 12. If there is no match for delivery recipient data in either the TSI or SUB signal, or if there is no delivery recipient data transmitted, then at step S30 the network fax 1 continues performing the regular fax transmission procedure, and receives the fax data from the remote fax machine 2. In this case, the fax data may not be delivered to a LAN 6 client. The network fax 1 may, however, store the received fax data, and make delivery upon instructions received via the operating unit of the network fax 1 or received over the LAN 6.

If the recipient data contained within either the TSI or SUB signal is stored in the delivery recipient table 12, then at step S25 the network fax machine 1 reads out the reception capabilities of the recipient from the table 12. Next, at step S26, the network fax 1 compares the reception capabilities indicated by the DCS signals, which are accompanied by TSI and SUB signals, with the reception capabilities of the delivery recipient read out from the table 12. At step S27, the network fax 1 determines whether or not the received fax data is to be broadcast to a plurality of delivery recipients. If not, then the program proceeds to step S28.

At step S28 the network fax 1 determines whether or not the original transmission parameters exceed the communication capabilities of the delivery recipient. The facsimile data will not be deliverable if received at parameters that exceed the recipient's capabilities. Prior art systems have dealt with this problem by converting the data to match the communication capabilities of the delivery recipient after the fax data has been received from the remote fax 2, but in the embodiment of the present invention, a new DIS signal matched to the reception capabilities of the delivery recipient is generated at step S29, and retransmitted to the remote facsimile machine 2 before the fax data is received. As understood from the differences between FIG. 3 and FIG. 4, this second DIS signal is transmitted instead of the confirmation to receive (CFR) signal. The remote facsimile 2 will then revise the transmission parameters based on the new DIS signal, send a DCS signal to the network fax 1, and perform training based on the new transmission parameters. This kind of DIS retransmission procedure can be conformed to ITU-T T. 30 recommended procedures.

This procedure enables facsimile transmission suited to the reception capabilities of the delivery reception, even if the identity of the delivery recipient is unclear in the transmission of the first DIS signal by declaring the reception capabilities of the delivery recipient after the delivery recipient has been specified.

This can be illustrated in the system 15 shown in FIG. 1. The network printer 5 is generally provided with capability to receive high-resolution images. Thus, when the network printer 5 is specified as the delivery recipient, the network fax 1 receives fax data for the network printer 5 at high resolution parameters. On the other hand, when the client 4, whose only output means is a comparatively low-resolution CRT display, is specified as the delivery recipient, the network fax 1 receives fax data for the client 4 at such low resolution. This then enables received fax data to be sent to the delivery recipient client machine 4 without having to perform a resolution conversion process at the network fax 1. Additionally, the amount of data in the transmission is significantly reduced, since it is low-resolution data, and transmission speed can be greatly improved.

Figure 4:
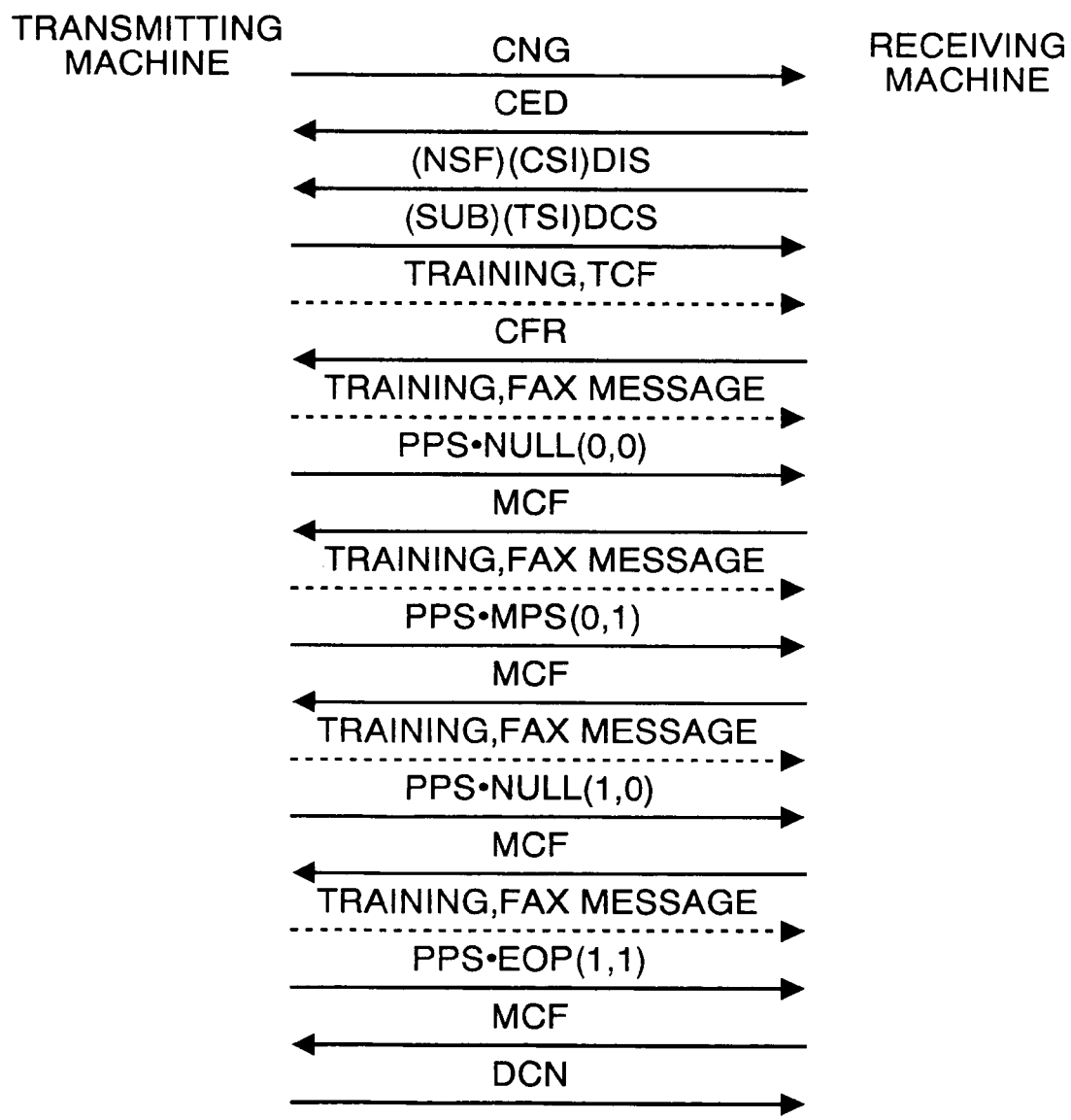
FIG. 4 is a sequence diagram showing a typical example of facsimile reception procedures employed by a conventional facsimile machine.

If it is determined at step S28 that the transmission parameters indicated by the DCS signal are inferior or equal to the reception capabilities of the delivery recipient, then receiving the fax data at the present parameters will be sufficient to enable the delivery recipient to receive the delivery. In fact, switching the transmission parameters to the reception capabilities of the delivery recipient would make it impossible for the remote fax 2 to transmit the fax data. The network fax 1 will thus receive the fax transmission according to the present transmission parameters. Prior to receiving of the fax data, the program advances to step S32, transmits a CFR signal (as shown in FIG. 4), and continues the facsimile communication procedure.

If broadcast transmission has been set, and there are thus a plurality of delivery recipients, the delivery recipients may have different reception capabilities. For this reason, at step S25 the network facsimile machine 1 reads out from the table 12 the reception capabilities of each of the plurality of delivery recipients of a broadcast transmission, and then compares those capabilities with the transmission parameters specified by the DCS signal at step S26. After passing through step S27, the program proceeds to step S31 to set the transmission parameters for broadcast transmission.

At step S31, the network fax 1 determines whether or not there are any delivery recipients incapable of receiving transmission at the current transmission parameters indicated by the DCS signal. If all of the delivery recipients can receive transmission at the current parameters, then the program proceeds to step S32, where the network fax 1 transmits a CFR signal, and continues normally with the facsimile communication program. If, however, one or more delivery recipients are incapable of receiving transmission at the current parameters, then the program proceeds to step S33, where a DIS signal is generated based on the lowest communication capability possessed by any of the delivery recipients. As shown in FIG. 3, the DIS signal is then retransmitted to the remote fax machine 2 instead of the CFR signal. The remote fax 2 receives this signal, and then revises the transmission parameters based on the retransmitted second DIS signal, sends a DCS signal to the network fax 1, and performs training based on the new transmission parameters.

After either continuing uninterruptedly with the facsimile communication program at step S32, or after sending a new DIS signal and changing the facsimile communication parameters at step S29 or S33, the program proceeds to step S34, where the network facsimile machine 1 receives the facsimile data. Upon completing of the fax data reception, the connection to the PSTN 3 is broken, and communication with the fax machine 2 is terminated. Subsequently, at step S35, the received fax data is delivered over the LAN 6 to the delivery recipient(s) specified by the SUB or TSI signals received in step S21. In order to deliver the fax data to the designated recipient(s), the network facsimile machine 1 refers to the delivery recipient table 12 and finds out the recipient's address on the LAN 6, as mentioned earlier.

As described above, in the present invention, facsimile communication is performed between the remote facsimile machine 2 and network facsimile 1 within the reception capabilities of the delivery recipients, thus obviating the need to perform a conversion procedure for converting resolution or the like before delivering the received fax data to the delivery recipient(s) from the network facsimile machine 1. This reduces the burden placed on the network facsimile machine 1.

As can be seen in the flowchart of FIG. 2, if it is determined at step S31 that any of the plurality of delivery recipients in a broadcast transmission have reception capabilities inferior to the transmission parameters indicated by the original DCS signal, making those delivery recipients incapable of receiving the fax transmission, then at step S33, communication parameters are reset to that of the lowest reception capability among the delivery recipients. In such case, a delivery recipient with high reception capabilities might receive fax data received at low communication capability parameters. For this reason, it is also satisfactory to modify the FIG. 2 flow chart as follows: in the processing at step S33 the DIS signal is generated based upon either the current communication parameters or based upon the highest reception capability possessed by any of the delivery recipients, and such DIS signal is resent to the remote facsimile machine 2. In this modification, the received facsimile data would be converted, or maybe not be converted, based on the reception capabilities of each delivery recipient before delivery is made to each recipient. For example, if the network printer 5 and CRT-equipped client 4 have been designated as delivery recipients, there would likely be a great difference between the resolution at which the printer 5 outputs the fax data on a recording sheet and that at which the client machine 4 displays the data on screen. In such case, the transmission parameters are set to the resolution of the network printer 5, and when the facsimile data is received, it is delivered and printed out by the network printer 5 at high resolution. When that data is then to be sent to the CRT-equipped client 4, it is converted to a lower resolution before delivery.

It should be noted that although in the present embodiment the SUB or TSI signal is used for the client-specifying data, the client may alternatively be specified using an ISDN sub-address, a DTMF signal, a caller ID information, or the like. If such signals are used to specify the delivery recipient(s), the delivery recipient table 12 should be referenced prior to sending the DIS signal indicative of recipient's capabilities to the remote facsimile machine 2. Specifically, the reception capabilities of the specified delivery recipients are first extracted from their ISDN sub-address, DTMF signal, caller ID information, etc. prepared in the table 12, then the DIS signal is generated according to these recipient's capabilities, and it is transmitted to the remote facsimile machine 2. This would allow facsimile communication to be performed according to the reception capabilities of the delivery recipients.

According to the present invention as thus described, reception capabilities are declared after confirmation of the delivery recipients, and fax communication performed within those capabilities. This eliminates the need to perform a conversion procedure after receiving the fax data in order to deliver the received fax data to delivery recipients. This thus reduces the burden placed on the network facsimile machine, and allows fax data reception be performed based on communication parameters that match those of the delivery recipients. For example, if the reception capabilities of devices such as a terminal device and a printer connected to a LAN network differ, facsimile communication is performed at parameters suited to each device's capabilities. Additionally, for a certain type or group of recipients, the length of facsimile communication may be reduced.

Further, when the SUB signal or the TSI signal is used as the client-specifying data, the DIS signal is changed and resent based on the reception capabilities of the delivery recipient, allowing declaration of the delivery recipient reception capabilities using standard ITU-T T. 30 procedures, and facsimile data transmission suited for the recipient's capabilities.

The illustrated and described network facsimile device and communication method are disclosed in Japanese Patent Application No. 11-104625 filed on Apr. 12, 1999 in JPO, the instant application claims priority of this Japanese Patent Application, and the entire disclosure thereof is herein incorporated by reference.

What is claimed is:

1. A network facsimile machine connectable to PSTN and a second network and adapted to receive fax data from a remote machine over the PSTN and deliver the fax data to recipients on the second network, the network facsimile machine comprising:
   a capabilities storage unit that stores data for delivery recipients on said second network and stores corresponding reception capabilities for said delivery recipients; and
   a communication control unit that receives delivery recipient-specifying data over the PSTN, obtains reception capabilities of delivery recipients with reference to this data in said capabilities storage unit, and transmits a signal over the PSTN declaring reception capabilities of a delivery recipient specified by the recipient-specifying data before receiving fax data including image data after receiving delivery recipient-specifying data.

2. The network facsimile machine of claim 1 wherein the delivery recipient-specifying data is a sub-address (SUB).

3. The network facsimile machine of claim 1 wherein the delivery recipient-specifying data is a Transmitting Subscriber Identification (TSI) signal.

4. The network facsimile machine of claim 1 wherein at least one of the delivery recipients on the second network is a terminal device.

5. The network facsimile machine of claim 1 wherein the delivery recipient specified by the recipient-specifying data is a terminal device connected to said second network.

6. The network facsimile machine of claim 2 wherein the capabilities storage unit stores addresses of the delivery recipients on the second network, the recipient-specifying data, and reception capabilities of said delivery recipients in predetermined correspondence.

7. The network facsimile machine of claim 3 wherein the capabilities storage unit stores addresses of the delivery recipients on the second network, the recipient-specifying data, and reception capabilities of said delivery recipients in predetermined relationship.

8. The network facsimile machine of claim 1 wherein at least one of the delivery recipients on the second network is an output device.

9. The network facsimile machine of claim 1 wherein the delivery recipient specified by the recipient-specifying data is an output device connected to said second network.

10. The network facsimile machine of claim 1 wherein the reception capabilities include resolution.

11. The network facsimile machine of claim 1 wherein when broadcasting to a plurality of delivery recipients on the second network, the reception capabilities of a delivery recipient with the lowest reception capability is declared.

12. The network facsimile machine of claim 1 wherein when broadcasting to a plurality of delivery recipients on the second network, the reception capabilities of a delivery recipient with the highest reception capability is declared.

13. The network facsimile machine of claim 1 wherein the network facsimile machine is directly connected between the PSTN and the second network, and wherein the second network is a LAN.

14. A communication method for use with a network facsimile machine connected to PSTN and a second network, at least one recipient being connected to the second network, comprising the steps of:
   (A) responding to a call from a remote facsimile machine over PSTN;
   (B) receiving delivery recipient-specifying data from the remote facsimile machine over the PSTN;
   (C) locating internally stored reception capabilities relating to the received delivery recipient-specifying data and determining reception capabilities of a designated delivery recipient based on the received recipient-specifying data and on the internally stored reception capabilities;

(D) transmitting a signal to the remote facsimile machine over the PSTN declaring the reception capabilities of the designated delivery recipient before receiving facsimile data and after receiving delivery recipient-specifying data;

(E) receiving facsimile data from the remote facsimile machine over the PSTN; and (F) delivering the received facsimile data to the designated delivery recipient over the second network.

15. The communication method of claim 14 wherein the delivery recipient-specifying data is a sub-address (SUB).

16. The communication method of claim 14 wherein the delivery recipient-specifying data is a TSI signal.

17. The communication method of claim 14 wherein the designated delivery recipient is a terminal device connected to said second network.

18. The communication method of claim 14 wherein the designated delivery recipient is an output device connected to said second network.

19. The communication method of claim 14 wherein the reception capabilities include resolution.

20. The communication method of claim 14 wherein when a plurality of delivery recipients are designated by the recipient-specifying data at step B, reception capabilities of each of the plurality of delivery recipients are determined at step C, and a signal declaring the reception capabilities of a delivery recipient with the lowest reception capabilities is transmitted to the remote facsimile machine over the PSTN at step D.

21. The communication method of claim 14 wherein the network facsimile machine directly communicates with the PSTN and the second network, and wherein the second network is a LAN.

* * * * *